United States Patent
Dallal et al.

(10) Patent No.: US 11,617,184 B2
(45) Date of Patent: Mar. 28, 2023

(54) ALLOCATION OF FREQUENCY RESOURCES BASED ON NARROWBAND ISOLATED FREQUENCIES

(71) Applicant: QUALCOMM Incorporated, San Diego, CA (US)

(72) Inventors: Yehonatan Dallal, Kfar Saba (IL); Ran Berliner, Kfar-Aviv (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 17/140,868

(22) Filed: Jan. 4, 2021

(65) Prior Publication Data

US 2022/0217727 A1 Jul. 7, 2022

(51) Int. Cl.

| | |
|---|---|
| *H04W 72/08* | (2009.01) |
| *H04L 1/00* | (2006.01) |
| *H04W 4/80* | (2018.01) |
| *H04W 72/04* | (2023.01) |
| *H04W 80/02* | (2009.01) |
| *H04L 5/00* | (2006.01) |
| *H04W 72/0453* | (2023.01) |

(52) U.S. Cl.
CPC ......... *H04W 72/085* (2013.01); *H04L 1/0003* (2013.01); *H04L 5/0044* (2013.01); *H04L 5/0094* (2013.01); *H04W 4/80* (2018.02); *H04W 72/042* (2013.01); *H04W 72/0453* (2013.01); *H04W 80/02* (2013.01); *H04L 5/0051* (2013.01)

(58) Field of Classification Search
CPC ... H04W 72/085; H04W 4/80; H04W 72/042; H04W 72/0453; H04W 80/02; H04L 1/0003; H04L 5/0044; H04L 5/0051; H04L 5/0094
See application file for complete search history.

(56) References Cited

U.S. PATENT DOCUMENTS

| | | | |
|---|---|---|---|
| 2014/0355459 A1 | 12/2014 | Rafique | |
| 2018/0191426 A1* | 7/2018 | Mirra | H04B 7/18582 |
| 2019/0045498 A1* | 2/2019 | Huang | H04L 5/0048 |
| 2020/0014509 A1 | 1/2020 | Asterjadhi et al. | |

FOREIGN PATENT DOCUMENTS

| | | | | |
|---|---|---|---|---|
| EP | 2648448 A1 * | 10/2013 | ........... | H04B 7/0452 |
| WO | 2018049683 A1 | 3/2018 | | |

OTHER PUBLICATIONS

International Search Report and Written Opinion—PCT/US2021/058122—ISA/EPO—dated Mar. 3, 2022.

* cited by examiner

*Primary Examiner* — Omar J Ghowrwal
(74) *Attorney, Agent, or Firm* — Procopio, Cory, Hargreaves & Savitch LLP

(57) ABSTRACT

A configuration to avoid compromised frequencies to enhance frequency resource allocation. The apparatus determines one or more narrowband isolated frequencies from a set of frequencies, wherein the one or more narrowband isolated frequencies have a degraded quality. The apparatus allocates frequency resources based on a determination of the one or more narrowband isolated frequencies from the set of frequencies. The apparatus provides, to a UE, the frequency resources for communication with the base station.

30 Claims, 9 Drawing Sheets

ALLOCATION OF FREQUENCY RESOURCES BASED ON NARROWBAND ISOLATED FREQUENCIES

BACKGROUND

Technical Field

The present disclosure relates generally to communication systems, and more particularly, to a configuration for an enhanced frequency resource skipping.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a base station. The device may be a processor and/or a modem at a base station or the base station itself. The apparatus determines one or more narrowband isolated frequencies from a set of frequencies, wherein the one or more narrowband isolated frequencies have a degraded quality. The apparatus allocates frequency resources based on a determination of the one or more narrowband isolated frequencies from the set of frequencies. The apparatus provides, to a user equipment (UE), the frequency resources for communication with the base station.

In an aspect of the disclosure, a method, a computer-readable medium, and an apparatus are provided. The apparatus may be a device at a UE. The device may be a processor and/or a modem at a UE or the UE itself. The apparatus receives, from a base station, an allocation of frequency resources based on a determination of one or more narrowband isolated frequencies from the set of frequencies, wherein the one or more narrowband isolated frequencies have a degraded quality. The apparatus communicates with the base station based on the allocation of frequency resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
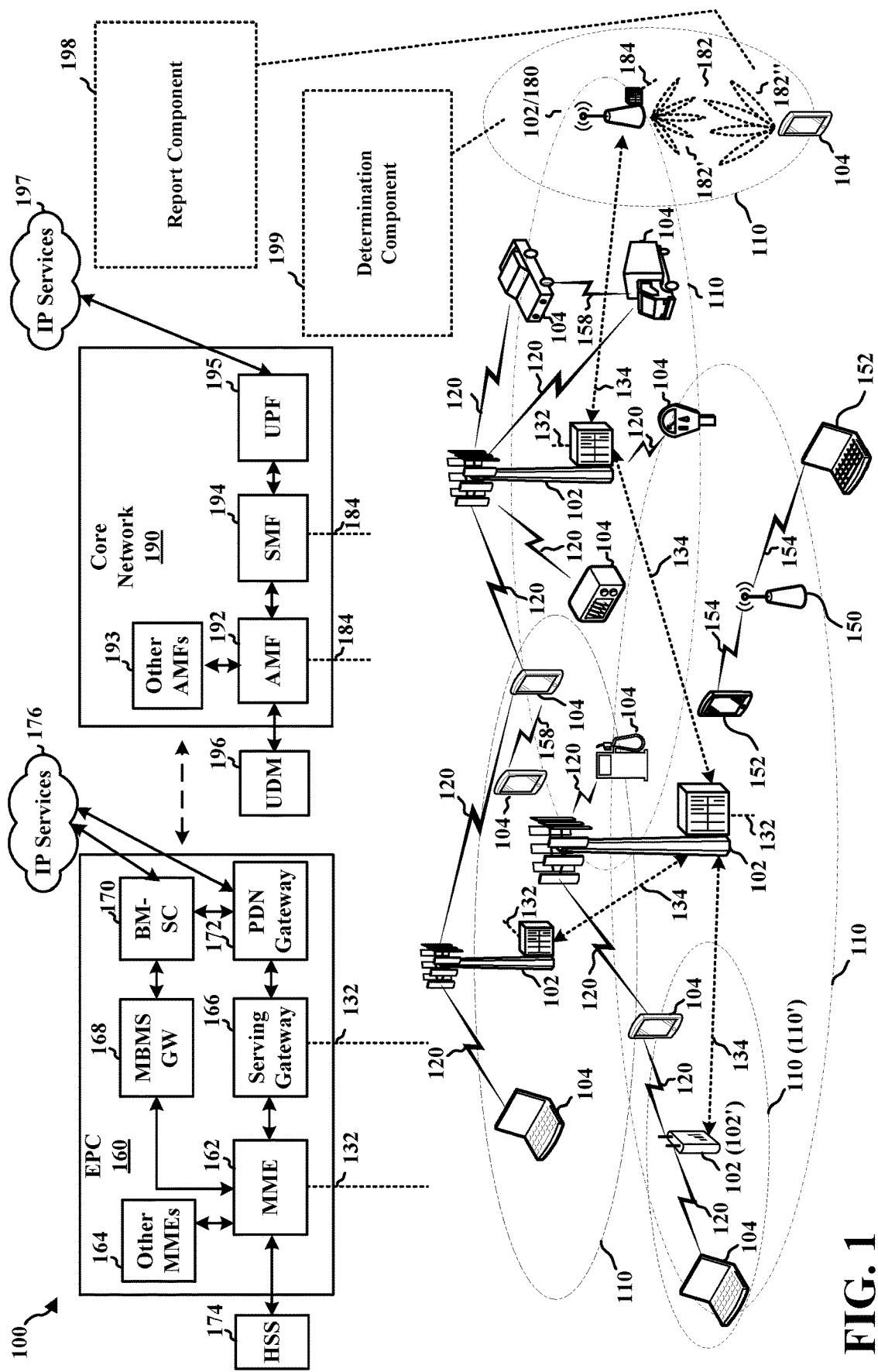
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, BLUETOOTH®, ZIGBEE®, WI-FI® based on the Institute of Electrical and Electronics Engineers (IEEE) 802.11 standard, LTE, or NR.

The wireless communications system may further include a WI-FI® access point (AP) 150 in communication with WI-FI® stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the WI-FI® AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to provide to the base station 180 a compromised frequency report of spurious frequencies. For example, the UE 104 may comprise a report component 198 configured to provide the compromised frequency report to the base station 180. The UE 104 may receive, from the base station 180, an allocation of frequency resources based on a determination of one or more narrowband isolated frequencies from the set of frequencies. The one or more narrowband isolated frequencies may have a degraded quality. The UE 104 may communicate with the base station 180 based on the allocation of frequency resources.

Referring again to FIG. 1, in certain aspects, the base station 180 may be configured to avoid compromised frequencies to enhance frequency resource allocation. For example, the base station 180 may comprise a determination component 199 configured to determine one or more narrowband isolated frequencies. The base station 180 may determine one or more narrowband isolated frequencies from a set of frequencies. The one or more narrowband isolated frequencies may have a degraded quality. The base station 180 may allocate frequency resources based on a determination of the one or more narrowband isolated frequencies from the set of frequencies. The base station 180 may provide, to the UE 104, the frequency resources for communication with the base station 180.

Although the following description may be focused on 5G NR, the concepts described herein may be applicable to other similar areas, such as LTE, LTE-A, CDMA, GSM, and other wireless technologies.

Figure 2:
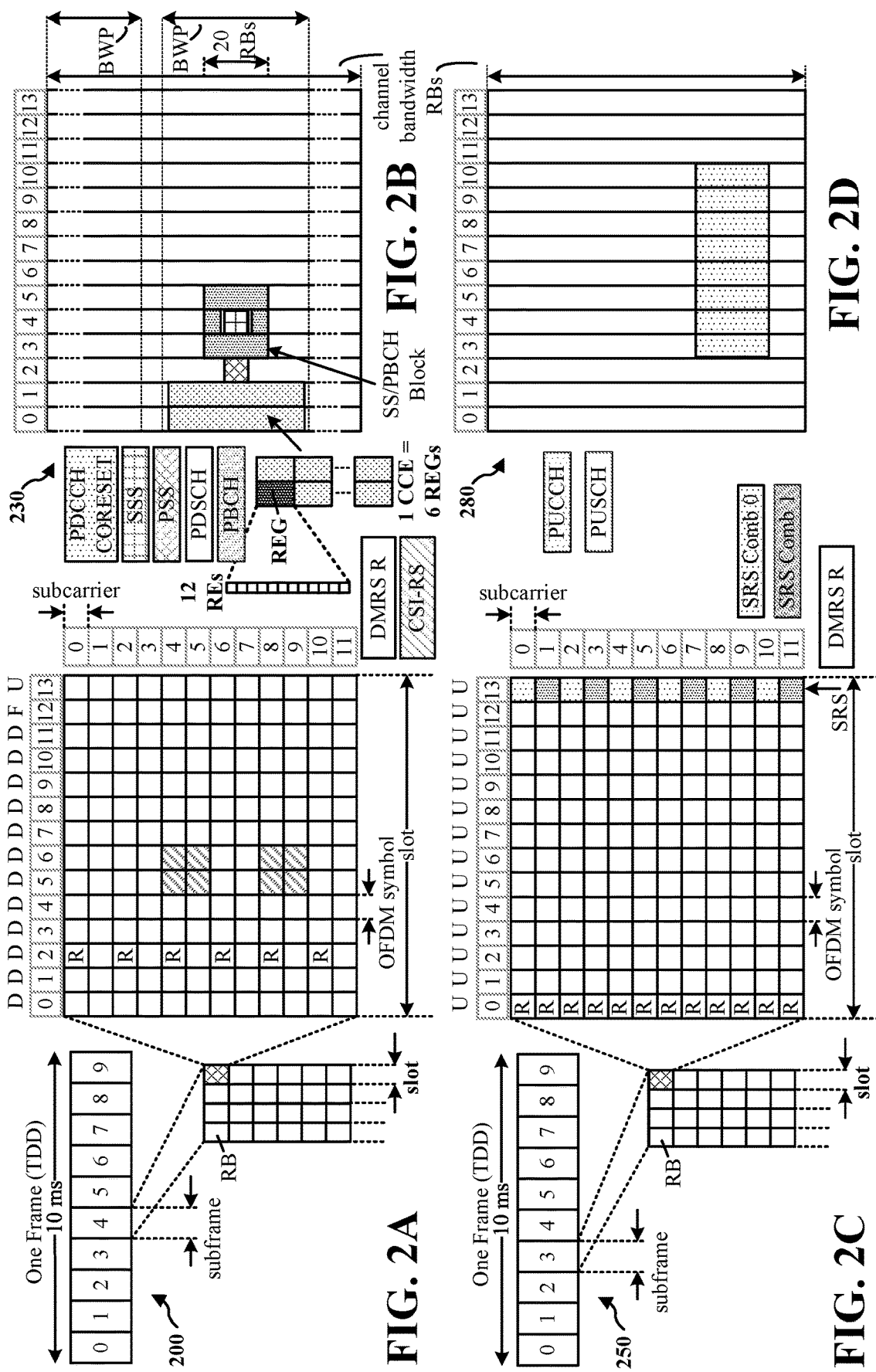
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
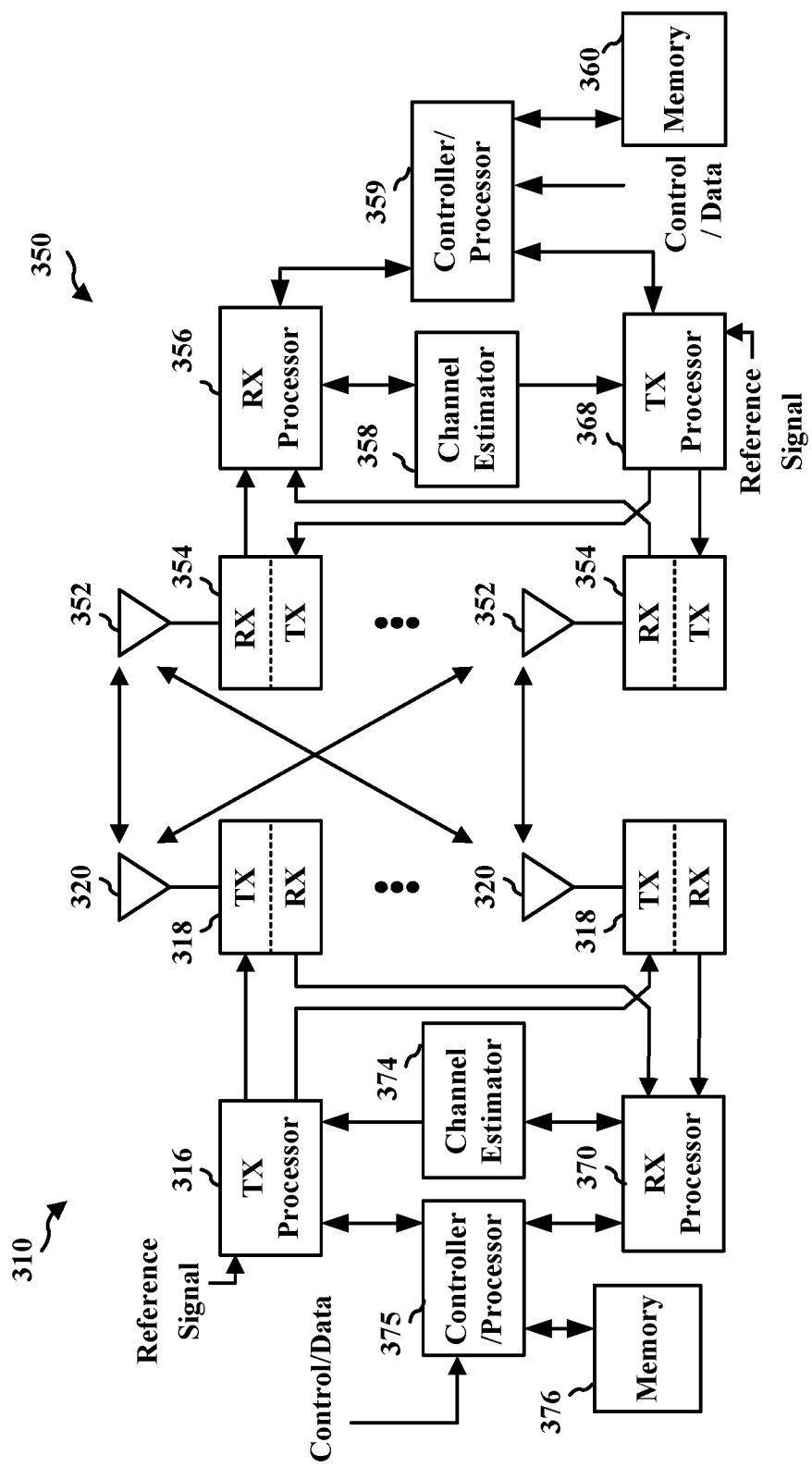
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In some wireless communication systems, in certain situations, isolated frequencies or narrow regions in a frequency domain may have a significantly lower fidelity than other frequencies within the frequency domain. These isolated frequencies may be degraded due to several factors, such as but not limited to, internally generated spurs at the receiver, which may be static and may be characterized in production, but may depend on a changing UE radio configuration; spurs embedded in a transmitted signal, which may be characterized as static; externally generated jamming or interference, which may be characterized as non-static; channel nulls, which may be non-static, that may be wider than other impairments but still only a few RBs or REs; or regions where channel estimation is of lower quality (e.g., edges).

Figure 4:
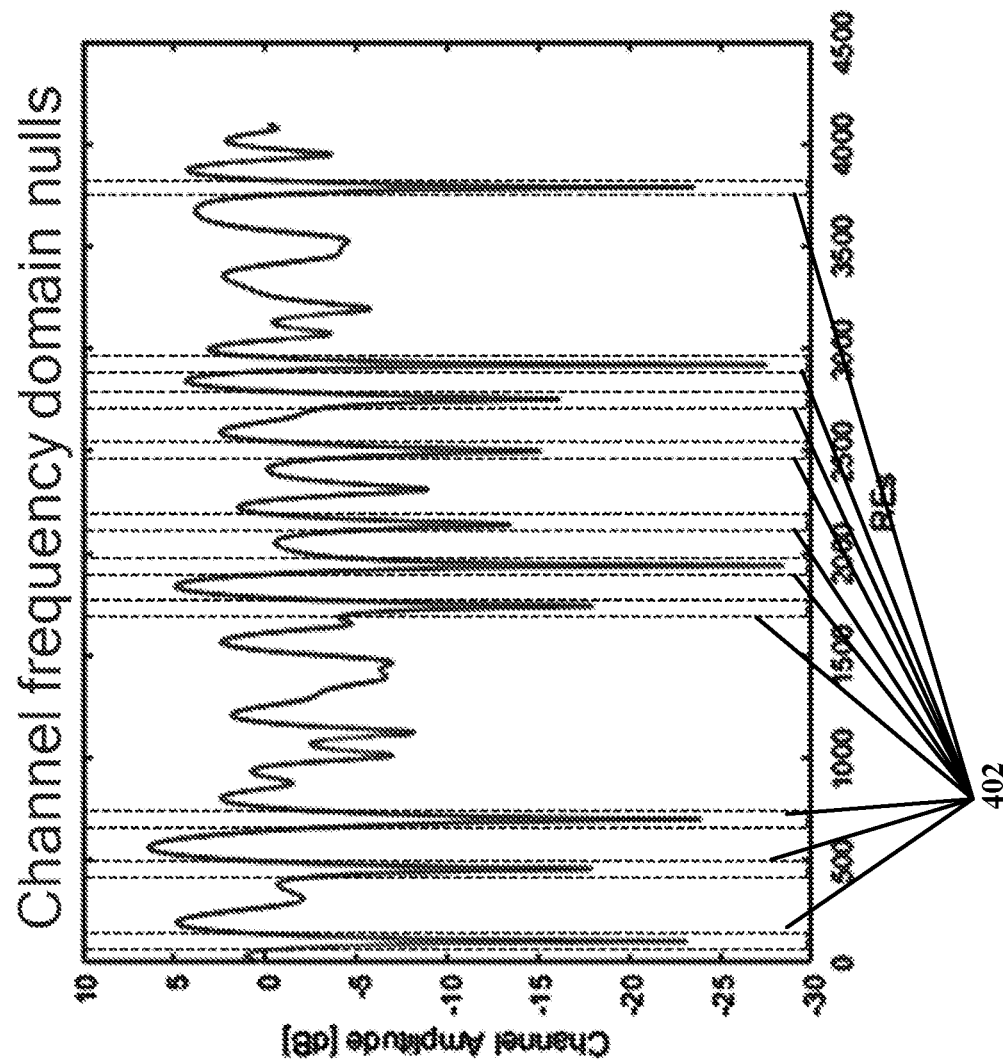
FIG. 4 is a diagram illustrating channel frequency domain nulls.

FIG. 4 is a diagram 400 illustrating channel frequency domain nulls. The diagram 400 depicts an example of channel frequency domain nulls or isolated frequencies 402. These isolated frequencies 402 have a degraded quality in comparison to other frequencies within the channel frequency domain. The isolated frequencies 402 may compromise the quality of service. In addition, the impairments to the signal integrity from the isolated frequencies 402, if treated accordingly, may not have a significant effect on the overall system performance. For example, avoiding the isolated frequencies 402 may improve system performance.

If the isolated frequencies 402 are to be skipped during the allocation of resources, the UE may not be notified of the difference of power spectral density of two types of resource elements (REs). For example, if there are a certain number of isolated frequencies 402 or REs that are going to be skipped, then the power of the remaining REs may be increased. If the power of the remaining REs is increased but the power of the DMRS is not increased similarly, then the UE may not be able to properly demodulate the signal. As such, if the power of the DMRS is going to be increased, then the UE needs to be aware of the increase of the DMRS in order to properly demodulate the signal.

Aspects presented herein provide a configuration for an enhanced frequency resource skipping. The configuration may allow for a base station to skip isolated narrowband frequencies which may improve performance. The configuration may also allow a UE to provide a report to the base station of isolated frequency domain resources that the base station should avoid. In addition, the configuration may allow the base station to provide to a UE a power compensation report comprising a ratio between PDSCH and DMRS.

In some instances, the base station may be configured to skip isolated frequencies when allocating frequency resources to a UE. The base station may determine the isolated frequencies to skip, due in part, to a report received from the UE. The report from the UE may include isolated frequencies that the base station should avoid when allocating frequency resources. The base station by avoiding compromised frequencies may improve system performance while utilizing minimal processing costs. The base station being able to deal with isolated frequencies may allow the base station to efficiently utilize available bandwidth, as opposed to avoiding wide bands around impairments (e.g., sub-bands). The base station being able to account for receiver spurs may allow for resilience to spurs which may result in reducing the complexity of the RF design. In addition, further reduction of receiver complexity may be achieved due to a lower dynamic range in utilized channels in the case of nulls. In some instances, a higher modulation and coding scheme (MCS) may be applied when skipping isolated frequencies than would have been applied when the spurs are present, and not skipped, in the allocation of resources.

In some instances, the changes in the allocation may be incremental. For example, new spurs may be reported or some spurs that have been reported may be deleted. A frequency domain puncturing scheme may be of various frequency domain resolutions, such as but not limited to, isolated REs, isolated RBs, RB ranges, or a mix of isolated RBs with non-contiguous REs.

In some instances, the report from the UE may be a snap-shot of all the spurs detected at a given moment of time. The report from the UE may be incremental, such that new spurs may be detected and/or deleted since the last report. This allows the UE to update the report. The report may comprise different frequency domain resolution, such as but not limited to RE list, RB list, RB ranges, or a mix of isolated RBs with non-contiguous REs. In some instances, the report from the UE may be comprised within a UE capability, such that the base station or the UE may determine whether to implement the UE report due to non-sequential processing in the frequency domain. In some instances, the UE report may be provided to the base station during an initial connection procedure with the base station.

In some instances, the base station may have a fine control over DMRS-PDSCH EPRE ratio, such that the power may be increased for the non-skipped or remaining REs in the PDSCH allocation, or may allow for the base station to keep a constant power symbol-to-symbol. The base station may provide the EPRE ratio within a control field in either DCI, MAC-CE, or RRC to advertise the explicit relative EPRE ratio between the PDSCH and the DMRS or power compensation mode. At least one advantage of the disclosure is that the base station may provide an increase of PDSCH power may improve system performance, or a constant power symbol-by-symbol power envelope, even in the case of an unusual allocation. In some instances, the DCI field may convey an explicit or implicit EPRE ratio. In some instances, the DCI field may indicate to the UE to compensate for zero power rate matched resources. In some instances, the DCI field may indicate to the UE to use an implicit scaling factor calculated from a known allocation size.

Figure 5:
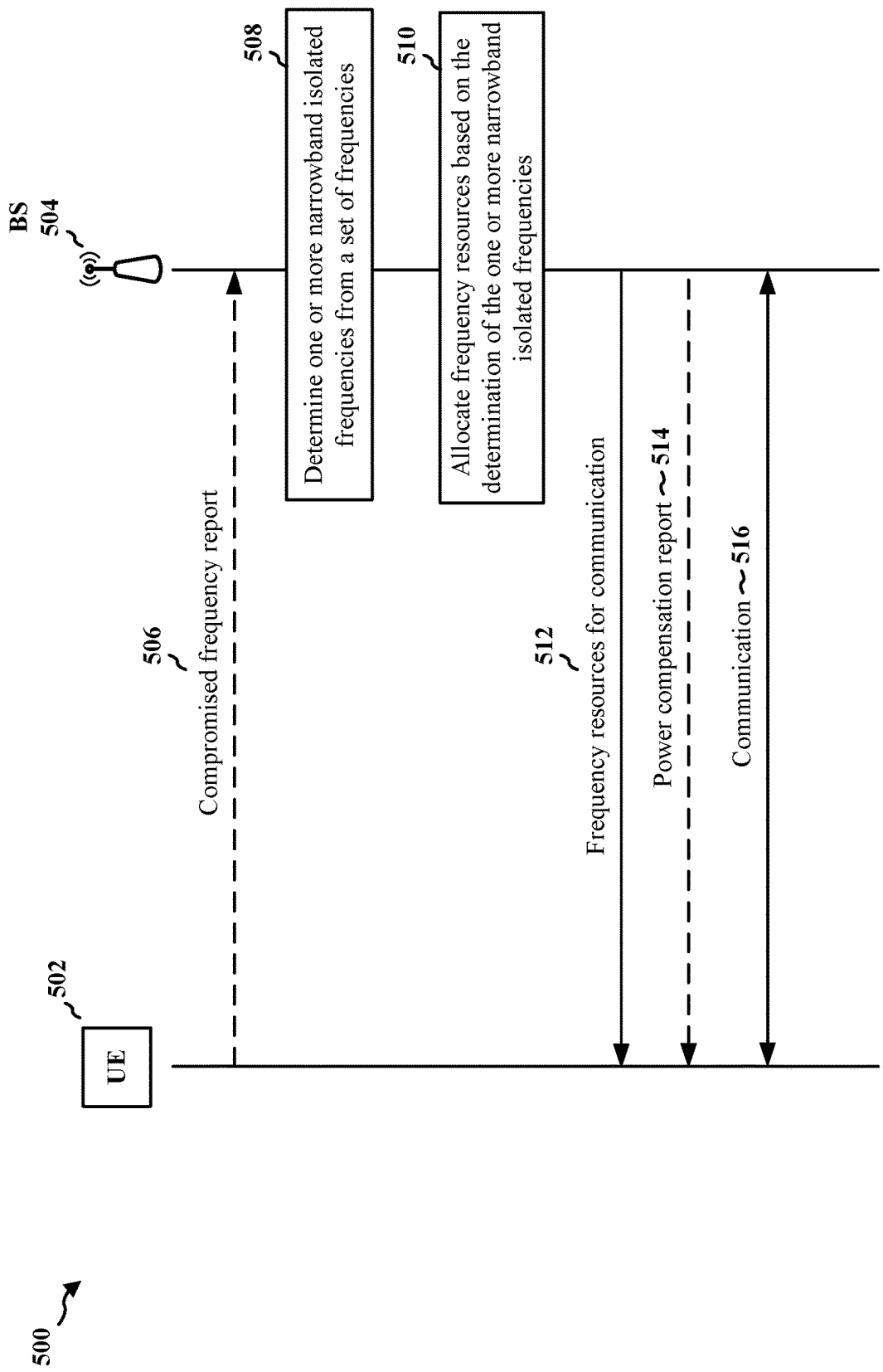
FIG. 5 is a call flow diagram of signaling between a UE and a base station.

FIG. 5 is a call flow diagram 500 of signaling between a UE 502 and a base station 504. The base station 504 may be configured to provide at least one cell. The UE 502 may be configured to communicate with the base station 504. For example, in the context of FIG. 1, the base station 504 may correspond to base station 102/180 and, accordingly, the cell may include a geographic coverage area 110 in which communication coverage is provided and/or small cell 102' having a coverage area 110'. Further, a UE 502 may correspond to at least UE 104. In another example, in the context of FIG. 3, the base station 504 may correspond to base station 310 and the UE 502 may correspond to UE 350. Optional aspects are illustrated with a dashed line.

In some aspects, for example as illustrated at 506, the UE 502 may transmit a compromised frequency report of spurious frequencies. The UE 502 may transmit the compromised frequency report to the base station 504. The base station 504 may receive the compromised frequency report from the UE 502. The compromised frequency report may be utilized by the base station 504 to determine one or more narrowband isolated frequencies. In some aspects, the compromised frequency report may be updated by the UE 502. The base station 504 may utilize the updated compromised frequency report to determine the one or more narrowband isolated frequencies. In some aspects, the base station 504 may skip the one or more narrowband isolated frequencies based on the compromised frequency report or the updated compromised frequency report to allocate the frequency resources. In some aspects, the UE 502 may transmit the compromised frequency report within a UE capability indication. The UE 502 may transmit the compromised frequency report within the UE capability indication to the base station 504. The UE capability indication may be transmitted during a connection establishment procedure with the base station.

As illustrated at 508, the base station 504 may determine one or more narrowband isolated frequencies from a set of frequencies. The one or more narrowband isolated frequencies may have a degraded quality in comparison to other frequencies within the set of frequencies. In some aspects, each of the one or more narrowband isolated frequencies may be smaller than one RB.

As illustrated at 510, the base station 504 may allocate frequency resources based on the determination of the one or more narrowband isolated frequencies from the set of frequencies. In some aspects, the base station 504 to allocate the frequency resources may skip unpatterned frequency resources. The unpatterned frequency resources may comprise the one or more narrowband isolated frequencies. In some aspects, an overall modulation and coding scheme (MCS) may be increased based at least on the skipping of the unpatterned frequency resources. In some aspects, the base station, to allocate the frequency resources, may skip patterned frequency resources. The patterned frequency resources may comprise the one or more narrowband isolated frequencies. In some aspects, the overall MCS may be increased based at least on the skipping of the patterned frequency resources.

As illustrated at 512, the base station 504 may provide the frequency resources for communication with the base station. The base station 504 may provide the frequency resources to the UE 502 for communication with the base station 504. The UE 502 may receive the frequency resources from the base station 504. In some aspects, the frequency resources may be provided to the UE 502 via downlink control information (DCI), radio resource control (RRC), or medium access control (MAC) control element (CE) (MAC-CE).

In some aspects, for example as illustrated at 514, the base station 504 may transmit a power compensation report. The base station 504 may transmit the power compensation report to the UE 502. The UE 502 may receive the power compensation report from the base station 504. The power compensation report may comprise an energy per resource element (EPRE) ratio between physical downlink shared channel (PDSCH) and demodulation reference signal (DMRS). In some aspects, the power compensation report may be within DCI. In some aspects, the power compensation report may provide an explicit or an implicit EPRE ratio. For example, the explicit EPRE ratio may be expressly indicated within the power compensation report. The implicit EPRE ratio may be indicated within the power compensation report such that the UE may calculate the actual EPRE ratio based on the implicit EPRE ratio. In some aspects, the implicit EPRE ratio may include an implicit scaling factor calculated from a known allocation size. In some aspects, the power compensation report may instruct the UE to compensate for zero power rate matched resources or to use the implicit scaling factor to determine the EPRE ratio. In some aspects, power for PDSCH and power for DMRS may be increased when the one or more narrowband isolated frequencies are not included in allocated frequency resources.

As illustrated at 516, the UE 502 and base station 504 may communicate with each other. The UE 502 and base station 504 may communicate with each other based on the allocated frequency resources.

Figure 6:
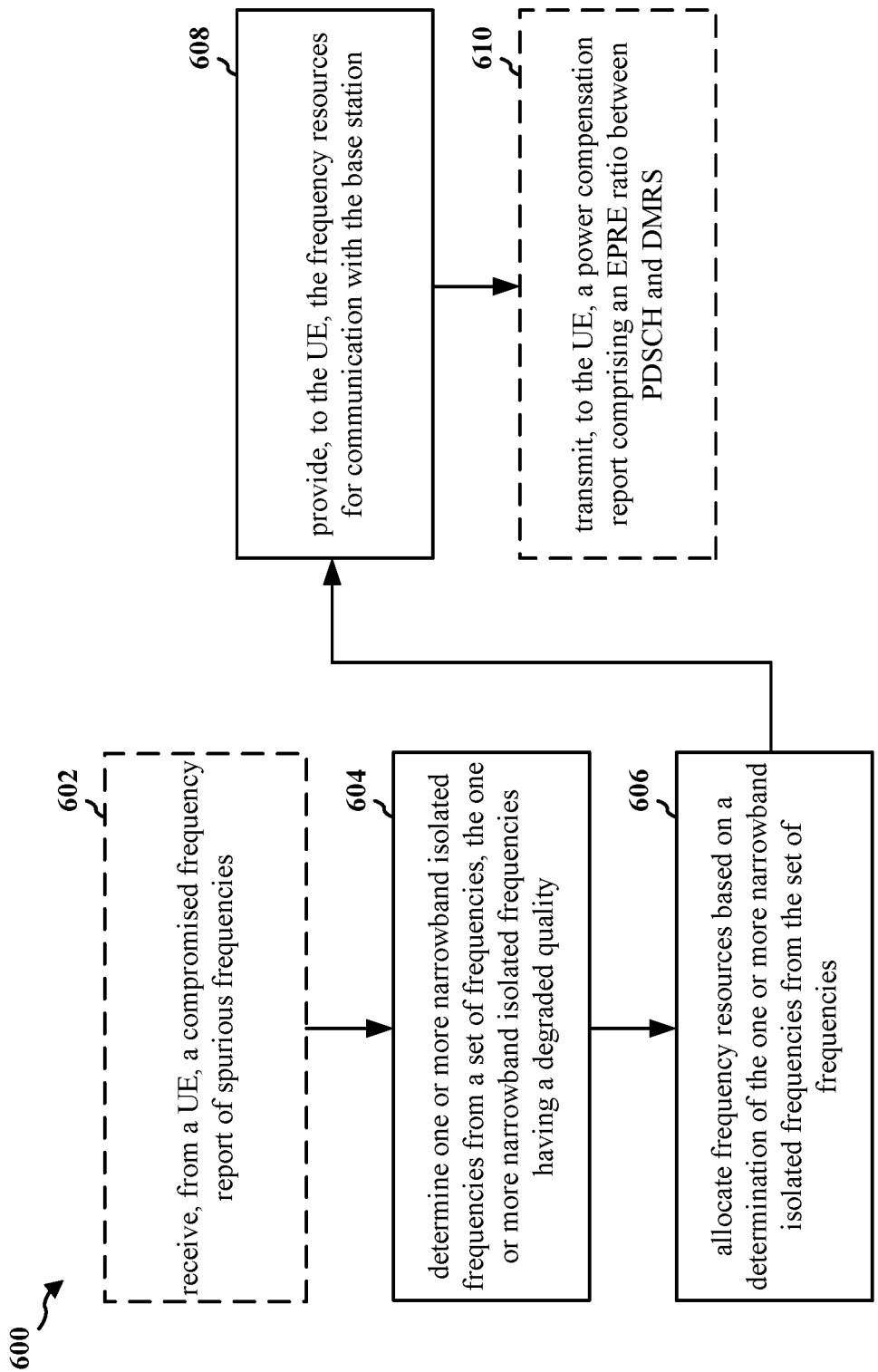
FIG. 6 is a flowchart of a method of wireless communication.

FIG. 6 is a flowchart 600 of a method of wireless communication. The method may be performed by a base station or a component of a base station (e.g., the base station 102/180; the apparatus 702; the baseband unit 704, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to avoid compromised frequencies to enhance frequency resource allocation.

In some aspects, for example at 602, the base station may receive a compromised frequency report of spurious frequencies. For example, 602 may be performed by report component 740 of apparatus 702. The base station may receive the compromised frequency report of the spurious frequencies from a UE. The compromised frequency report may be utilized by the base station to determine one or more narrowband isolated frequencies. In some aspects, the compromised frequency report may be updated by the UE. In some aspects, the base station may utilize the updated compromised frequency report to determine the one or more narrowband isolated frequencies. In some aspects, the base station may skip the one or more narrowband isolated frequencies based on the compromised frequency report to allocate the frequency resources. In some aspects, the compromised frequency report may be received from the UE within a UE capability indication. The UE capability indication may be received by the base station during a connection establishment procedure with the base station.

At 604, the base station may determine one or more narrowband isolated frequencies from a set of frequencies. For example, 604 may be performed by determination component 742 of apparatus 702. The one or more narrowband isolated frequencies may have a degraded quality in comparison to other frequencies within the set of frequencies. In some aspects, each of the one or more narrowband isolated frequencies may be smaller than one RB.

At 606, the base station may allocate frequency resources based on a determination of the one or more narrowband isolated frequencies from the set of frequencies. For example, 606 may be performed by allocation component 744 of apparatus 702. In some aspects, the base station, to allocate the frequency resources, may skip unpatterned frequency resources. The unpatterned frequency resources may comprise the one or more narrowband isolated frequencies. In some aspects, an overall MCS may be increased based at least on the skipping of the unpatterned frequency resources. In some aspects, the base station, to allocate the frequency resources, may skip patterned frequency resources. The patterned frequency resources may comprise the one or more narrowband isolated frequencies. In some aspects, the overall MCS may be increased based at least on the skipping of the patterned frequency resources.

At 608, the base station may provide the frequency resources for communication with the base station. For example, 608 may be performed by resource component 746 of apparatus 702. The base station may provide the frequency resources to the UE. In some aspects, the frequency resources may be provided to the UE via DCI, RRC, or MAC-CE.

In some aspects, for example at 610, the base station may transmit a power compensation report. For example, 610 may be performed by power compensation component 748 of apparatus 702. The base station may transmit the power compensation report to the UE. The power compensation report may comprise an EPRE ratio between PDSCH and DMRS. In some aspects, the power compensation report may be within DCI. In some aspects, the power compensation report may provide an explicit or an implicit EPRE ratio. For example, the explicit EPRE ratio may be expressly indicated within the power compensation report. The implicit EPRE ratio may be indicated within the power compensation report such that the UE may calculate the actual EPRE ratio based on the implicit EPRE ratio. In some aspects, the implicit EPRE ratio may include an implicit scaling factor calculated from a known allocation size. In some aspects, the power compensation report may instruct the UE to compensate for zero power rate matched resources or to use the implicit scaling factor to determine the EPRE ratio. In some aspects, power for PDSCH and power for DMRS may be increased when the one or more narrowband isolated frequencies are not included in allocated frequency resources.

Figure 7:
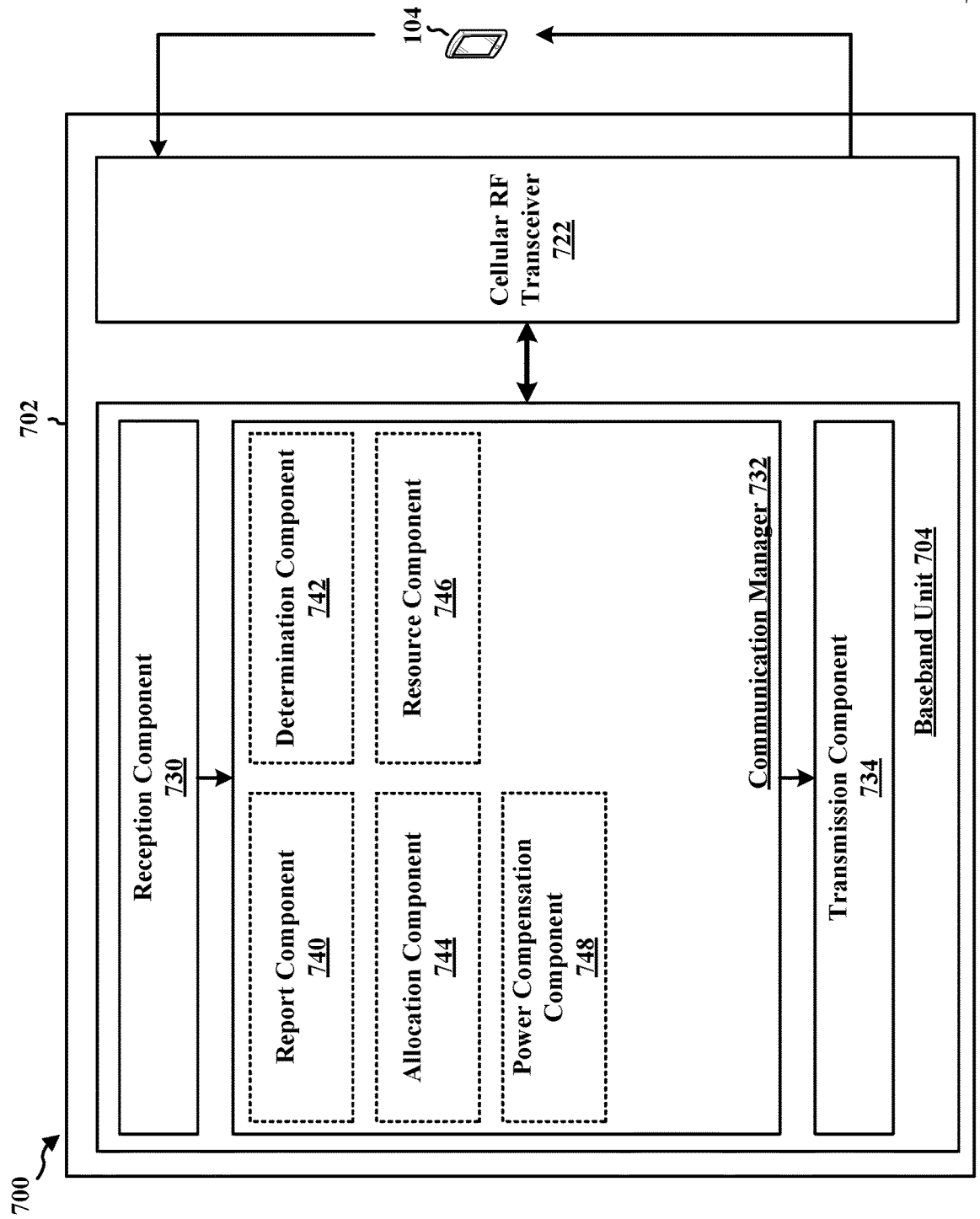
FIG. 7 is a diagram illustrating an example of a hardware implementation for an example apparatus.

FIG. 7 is a diagram 700 illustrating an example of a hardware implementation for an apparatus 702. The apparatus 702 is a BS and includes a baseband unit 704. The baseband unit 704 may communicate through a cellular RF transceiver 722 with the UE 104. The baseband unit 704 may include a computer-readable medium/memory. The baseband unit 704 is responsible for general processing, including the execution of software stored on the computer-readable medium/memory. The software, when executed by the baseband unit 704, causes the baseband unit 704 to perform the various functions described supra. The computer-readable medium/memory may also be used for storing data that is manipulated by the baseband unit 704 when executing software. The baseband unit 704 further includes a reception component 730, a communication manager 732, and a transmission component 734. The communication manager 732 includes the one or more illustrated components. The components within the communication manager 732 may be stored in the computer-readable medium/memory and/or configured as hardware within the baseband unit 704. The baseband unit 704 may be a component of the BS 310 and may include the memory 376 and/or at least one of the TX processor 316, the RX processor 370, and the controller/processor 375.

The communication manager 732 includes a report component 740 that may receive a compromised frequency report of spurious frequencies, e.g., as described in connection with 602 of FIG. 6. The communication manager 732 further includes a determination component 742 that may determine one or more narrowband isolated frequencies from a set of frequencies, e.g., as described in connection with 604 of FIG. 6. The communication manager 732 further includes an allocation component 744 that may allocate frequency resources based on a determination of the one or more narrowband isolated frequencies from the set of frequencies, e.g., as described in connection with 606 of FIG. 6. The communication manager 732 further includes a resource component 746 that may provide the frequency resources for communication with the base station, e.g., as described in connection with 608 of FIG. 6. The communication manager 732 further includes a power compensation component 748 that may transmit a power compensation report, e.g., as described in connection with 610 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the baseband unit 704, includes means for determining one or more narrowband isolated frequencies from a set of frequencies. The one or more narrowband isolated frequencies have a degraded quality. The apparatus includes means for allocating frequency resources based on a determination of the one or more narrowband isolated frequencies from the set of frequencies. The apparatus includes means for providing, to a UE, the frequency resources for communication with the base station. The apparatus further includes means for receiving, from the UE, a compromised frequency report of spurious frequencies. The compromised frequency report is utilized to determine the one or more narrowband isolated frequencies. The apparatus further includes means for transmitting, to the UE, a power compensation report comprising an EPRE ratio between PDSCH and DMRS. The aforementioned means may be one or more of the aforementioned components of the apparatus 702 configured to perform the functions recited by the aforementioned means. As described supra, the apparatus 702 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 8:
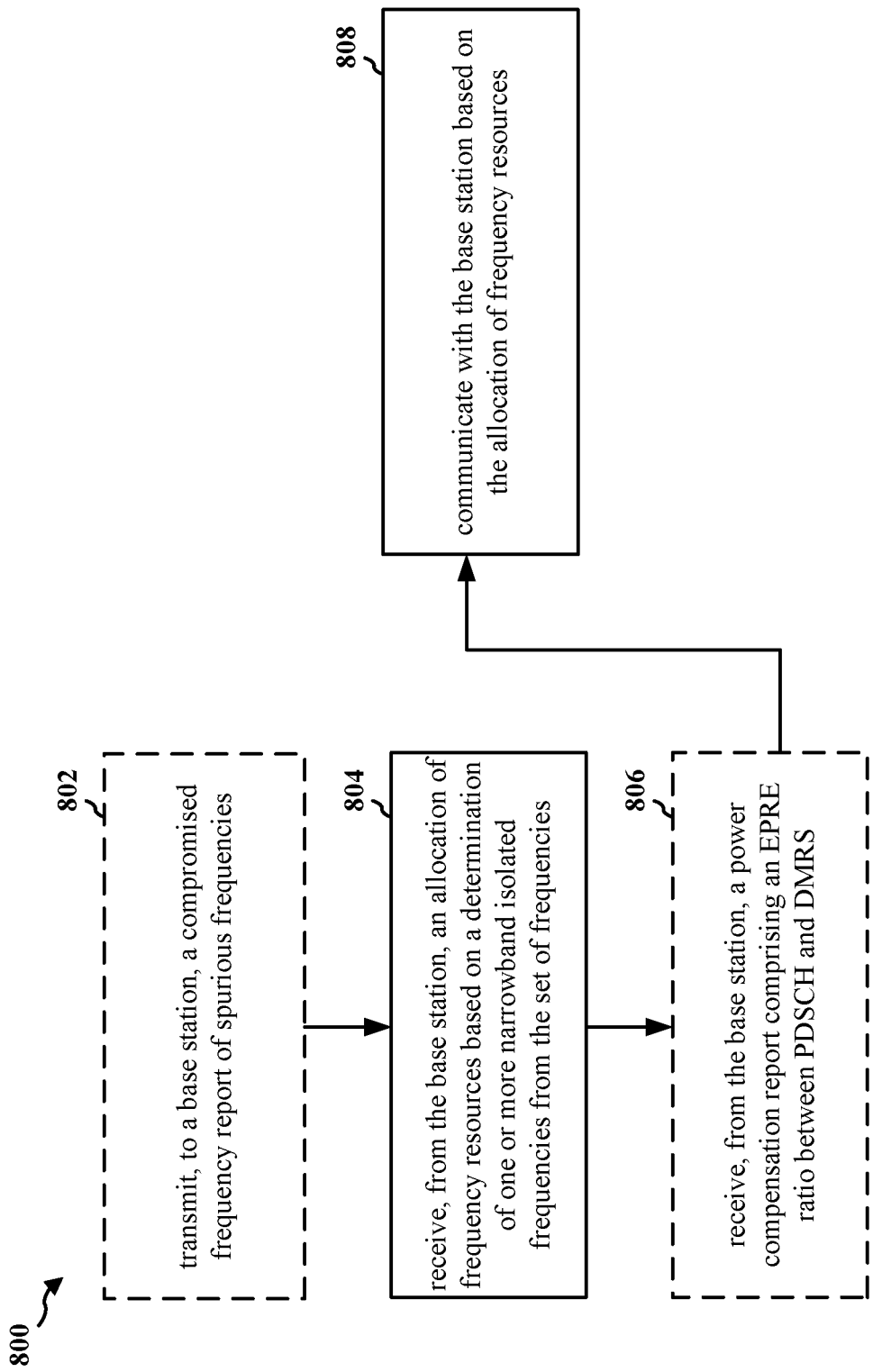
FIG. 8 is a flowchart of a method of wireless communication.

FIG. 8 is a flowchart 800 of a method of wireless communication. The method may be performed by a UE or a component of a UE (e.g., the UE 104; the apparatus 902; the cellular baseband processor 904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a UE to provide a compromised frequency report of spurious frequencies to a base station.

In some aspects, for example at 802, the UE may transmit a compromised frequency report of spurious frequencies. For example, 802 may be performed by report component 940 of apparatus 902. The UE may transmit the compromised frequency report to the base station. The compromised frequency report may be utilized by the base station to determine one or more narrowband isolated frequencies. In some aspects, the compromised frequency report may be updated by the UE. The base station may utilize the updated compromised frequency report to determine the one or more narrowband isolated frequencies. In some aspects, the base station may skip the one or more narrowband isolated frequencies based on the compromised frequency report or the updated compromised frequency report to allocate the frequency resources. In some aspects, the UE may transmit the compromised frequency report within a UE capability indication. The UE may transmit the compromised frequency report within the UE capability indication to the base station. The UE capability indication may transmitted, to the base station, during a connection establishment procedure with the base station.

At 804, the UE may receive an allocation of frequency resources. For example, 804 may be performed by resource component 942 of apparatus 902. The UE may receive the allocation of frequency resources from the base station. The allocation of frequency resources may be based on a determination of the one or more narrowband isolated frequencies from a set of frequencies. The one or more narrowband isolated frequencies may have a degraded quality in comparison to other frequencies within the set of frequencies. In some aspects, the allocation of the frequency resources may comprise skipped unpatterned frequency resources. The unpatterned frequency resources may comprise the one or more narrowband isolated frequencies. In some aspects, an overall MCS may be increased based at least on the skipped unpatterned frequency resources. In some aspects, the allocation of the frequency resources may comprise skipped patterned frequency resources. The patterned frequency resources may comprise the one or more narrowband isolated frequencies. In some aspects, an overall MCS may be increased based at least on the skipped patterned frequency resources. In some aspects, each of the one or more narrowband isolated frequencies may be smaller than one RB. The frequency resources may be received by the UE via DCI, RRC, or MAC-CE.

In some aspects, for example at 806, the UE may receive a power compensation report. For example, 806 may be performed by power compensation component 944 of apparatus 902. The UE may receive the power compensation report from the base station. The power compensation report may comprise an EPRE ratio between PDSCH and DMRS. In some aspects, the power compensation report may be within DCI. In some aspects, the power compensation report may provide an explicit or implicit EPRE ratio. For example, the explicit EPRE ratio may be expressly indicated within the power compensation report. The implicit EPRE ratio may be indicated within the power compensation report such that the UE may calculate the actual EPRE ratio based on the implicit EPRE ratio. In some aspects, the implicit EPRE ratio may include an implicit scaling factor calculated from a known allocation size. In some aspects, the UE may compensate for zero power rate matched resources or use an implicit scaling factor to determine the EPRE ratio based on the power compensation report.

At 808, the UE may communicate with the base station. For example, 808 may be performed by communication component 946 of apparatus 902. The UE may communicate with the base station based on the allocation of frequency resources.

Figure 9:
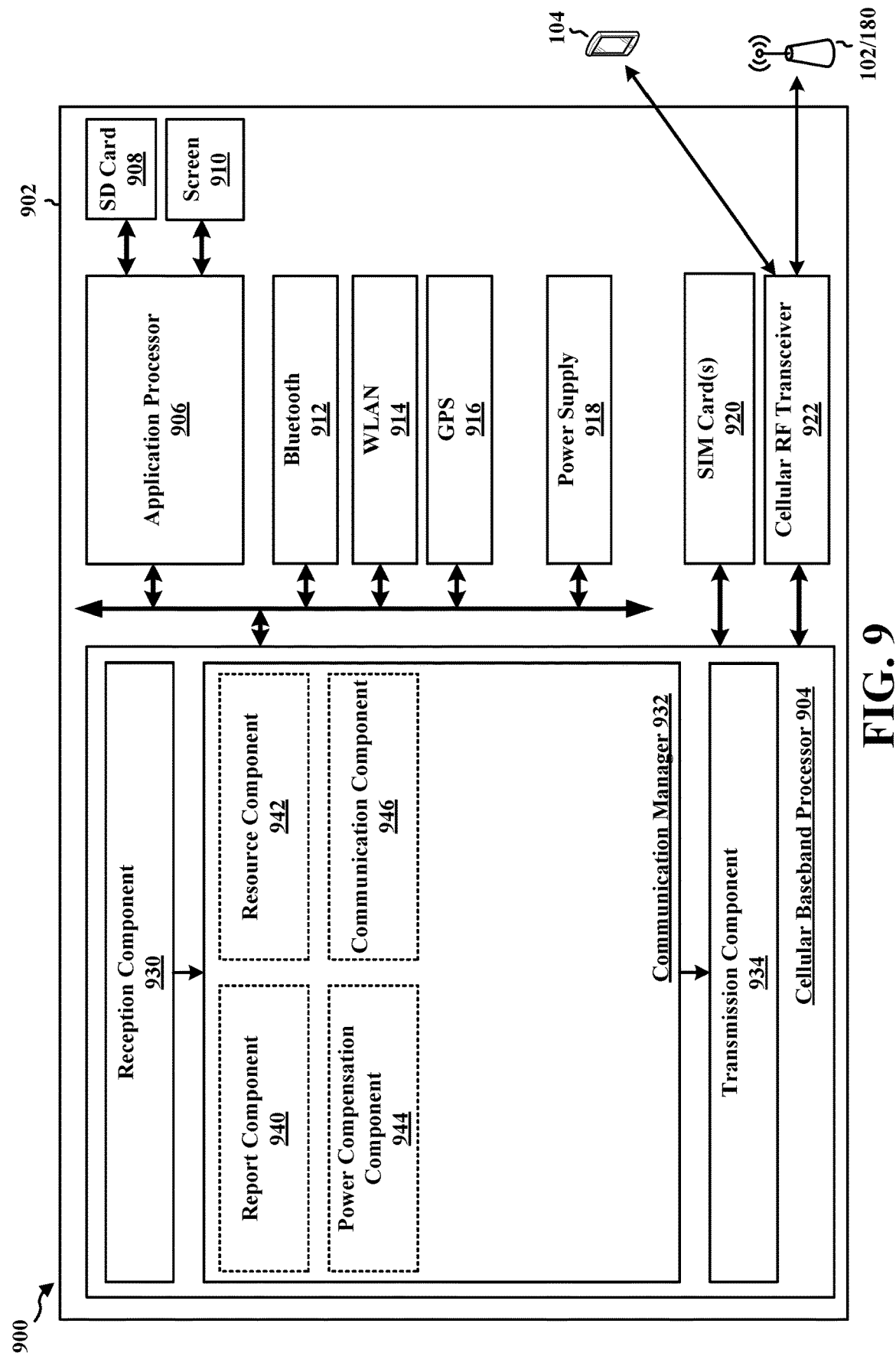
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a BLUETOOTH® module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the cellular baseband processor 904, and in another configuration, the apparatus 902 may be the entire UE (e.g., see 350 of FIG. 3) and include the aforediscussed additional modules of the apparatus 902.

The communication manager 932 includes a report component 940 that is configured to transmit a compromised frequency report of spurious frequencies, e.g., as described in connection with 802 of FIG. 8. The communication manager 932 further includes a resource component 942 that is configured to receive an allocation of frequency resources, e.g., as described in connection with 804 of FIG. 8. The communication manager 932 further includes a power compensation component 944 that is configured to receive a power compensation report, e.g., as described in connection with 806 of FIG. 8. The communication manager 932 further includes a communication component 946 that is configured to communicate with the base station based on the allocation of frequency resources, e.g., as described in connection with 808 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving, from a base station, an allocation of frequency resources based on a determination of one or more narrowband isolated frequencies from the set of frequencies. The one or more narrowband isolated frequencies have a degraded quality. The apparatus includes means for communicating with the base station based on the allocation of frequency resources. The apparatus further includes means for transmitting, to the base station, a compromised frequency report of spurious frequencies. The compromised frequency report is utilized by the base station to determine the one or more narrowband isolated frequencies. The apparatus further includes means for receiving, from the base station, a power compensation report comprising an EPRE ratio between PDSCH and DMRS. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication of a base station comprising determining one or more narrowband isolated frequencies from a set of frequencies, wherein the one or more narrowband isolated frequencies have a degraded quality; allocating frequency resources based on a determination of the one or more narrowband isolated frequencies from the set of frequencies; and providing, to a UE, the frequency resources for communication with the base station.

In Aspect 2, the method of Aspect 1 further includes that the allocating the frequency resources comprises skipping unpatterned frequency resources, wherein the unpatterned frequency resources comprise the one or more narrowband isolated frequencies, wherein an overall MCS is increased based at least on the skipping of the unpatterned frequency resources.

In Aspect 3, the method of Aspect 1 or 2 further includes that the allocating the frequency resources comprises skipping patterned frequency resources, wherein the patterned frequency resources comprise the one or more narrowband isolated frequencies, wherein an overall MCS is increased based at least on the skipping of the patterned frequency resources.

In Aspect 4, the method of any of Aspects 1-3 further includes that each of the one or more narrowband isolated frequencies is smaller than one RB.

In Aspect 5, the method of any of Aspects 1-4 further includes receiving, from the UE, a compromised frequency report of spurious frequencies, wherein the compromised frequency report is utilized to determine the one or more narrowband isolated frequencies.

In Aspect 6, the method of any of Aspects 1-5 further includes that the compromised frequency report is updated, by the UE, such that the base station utilizes an updated compromised frequency report to determine the one or more narrowband isolated frequencies.

In Aspect 7, the method of any of Aspects 1-6 further includes that the base station skips the one or more narrowband isolated frequencies based on the compromised frequency report to allocate the frequency resources.

In Aspect 8, the method of any of Aspects 1-7 further includes that the compromised frequency report is received, from the UE, within a UE capability indication, wherein the UE capability indication is received during a connection establishment procedure with the base station.

In Aspect 9, the method of any of Aspects 1-8 further includes that the frequency resources are provided to the UE via DCI, RRC, or MAC-CE.

In Aspect 10, the method of any of Aspects 1-9 further includes transmitting, to the UE, a power compensation report comprising an EPRE ratio between PDSCH and DMRS.

In Aspect 11, the method of any of Aspects 1-10 further includes that the power compensation report is within DCI.

In Aspect 12, the method of any of Aspects 1-11 further includes that the power compensation report provides an explicit or implicit EPRE ratio.

In Aspect 13, the method of any of Aspects 1-12 further includes that the power compensation report instructs the UE to compensate for zero power rate matched resources or to use an implicit scaling factor to determine the EPRE ratio.

In Aspect 14, the method of any of Aspects 1-13 further includes that power for PDSCH and power for DMRS are increased when the one or more narrowband isolated frequencies are not included in allocated frequency resources.

Aspect 15 is a device including one or more processors and one or more memories in electronic communication with the one or more processors storing instructions executable by the one or more processors to cause the system or apparatus to implement a method as in any of Aspects 1-14.

Aspect 16 is a system or apparatus including means for implementing a method or realizing an apparatus as in any of Aspects 1-14.

Aspect 17 is a non-transitory computer readable medium storing instructions executable by one or more processors to cause the one or more processors to implement a method as in any of Aspects 1-14.

Aspect 18 is a method of wireless communication of a UE comprising receiving, from a base station, an allocation of frequency resources based on a determination of one or more narrowband isolated frequencies from the set of frequencies, wherein the one or more narrowband isolated frequencies have a degraded quality; and communicating with the base station based on the allocation of frequency resources.

In Aspect 19, the method of Aspect 18 further includes that the allocation of the frequency resources comprises skipped unpatterned frequency resources, wherein the unpatterned frequency resources comprise the one or more narrowband isolated frequencies, wherein an overall MCS is increased based at least on the skipped unpatterned frequency resources.

In Aspect 20, the method of Aspect 18 or 19 further includes that the allocation of the frequency resources comprises skipped patterned frequency resources, wherein the patterned frequency resources comprise the one or more narrowband isolated frequencies, wherein an overall MCS is increased based at least on the skipped patterned frequency resources.

In Aspect 21, the method of any of Aspects 18-20 further includes that each of the one or more narrowband isolated frequencies is smaller than one RB.

In Aspect 22, the method of any of Aspects 18-21 further includes transmitting, to the base station, a compromised frequency report of spurious frequencies, wherein the compromised frequency report is utilized by the base station to determine the one or more narrowband isolated frequencies.

In Aspect 23, the method of any of Aspects 18-22 further includes that the compromised frequency report is updated, by the UE, such that the base station utilizes an updated compromised frequency report to determine the one or more narrowband isolated frequencies.

In Aspect 24, the method of any of Aspects 18-23 further includes that the base station skips the one or more narrowband isolated frequencies based on the compromised frequency report to allocate the frequency resources.

In Aspect 25, the method of any of Aspects 18-24 further includes that the compromised frequency report is transmitted, by the UE, within a UE capability indication, wherein the UE capability indication is transmitted during a connection establishment procedure with the base station.

In Aspect 26, the method of any of Aspects 18-25 further includes that the frequency resources are received by the UE via DCI, RRC, or MAC-CE.

In Aspect 27, the method of any of Aspects 18-26 further includes receiving, from the base station, a power compensation report comprising an EPRE ratio between PDSCH and DMRS.

In Aspect 28, the method of any of Aspects 18-27 further includes that the power compensation report is within DCI.

In Aspect 29, the method of any of Aspects 18-28 further includes that the power compensation report provides an explicit or implicit EPRE ratio.

In Aspect 30, the method of any of Aspects 18-29 further includes that the UE compensates for zero power rate matched resources or uses an implicit scaling factor to determine the EPRE ratio based on the power compensation report.

Aspect 31 is a device including one or more processors and one or more memories in electronic communication with the one or more processors storing instructions executable by the one or more processors to cause the system or apparatus to implement a method as in any of Aspects 18-30.

Aspect 32 is a system or apparatus including means for implementing a method or realizing an apparatus as in any of Aspects 18-30.

Aspect 33 is a non-transitory computer readable medium storing instructions executable by one or more processors to cause the one or more processors to implement a method as in any of Aspects 18-30.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station, comprising:
   determining one or more narrowband isolated frequencies from a set of frequencies, wherein the one or more narrowband isolated frequencies have a degraded quality;
   allocating frequency resources based on a determination of the one or more narrowband isolated frequencies from the set of frequencies, wherein the allocating the frequency resources comprises at least one of skipping unpatterned frequency resources or skipping patterned frequency resources, wherein at least one of the unpatterned frequency resources or the patterned frequency resources comprise the one or more narrowband isolated frequencies, wherein an overall modulation and coding scheme (MCS) is increased based at least on the skipping of the unpatterned frequency resources or the skipping of the patterned frequency resources; and
   providing, to a user equipment (UE), the frequency resources for communication with the base station.

2. The method of claim 1, wherein the allocating the frequency resources comprises the skipping the unpatterned frequency resources, wherein the unpatterned frequency resources comprise the one or more narrowband isolated frequencies, wherein the overall MCS is increased based at least on the skipping of the unpatterned frequency resources.

3. The method of claim 1, wherein the allocating the frequency resources comprises the skipping the patterned frequency resources, wherein the patterned frequency resources comprise the one or more narrowband isolated frequencies, wherein the overall MCS is increased based at least on the skipping of the patterned frequency resources.

4. The method of claim 1, wherein each of the one or more narrowband isolated frequencies is smaller than one resource block (RB).

5. The method of claim 1, further comprising:
   receiving, from the UE, a compromised frequency report of spurious frequencies, wherein the compromised frequency report is utilized to determine the one or more narrowband isolated frequencies.

6. The method of claim 5, wherein the compromised frequency report is updated, by the UE, such that the base station utilizes an updated compromised frequency report to determine the one or more narrowband isolated frequencies.

7. The method of claim 5, wherein the base station skips the one or more narrowband isolated frequencies based on the compromised frequency report to allocate the frequency resources.

8. The method of claim 5, wherein the compromised frequency report is received, from the UE, within a UE capability indication, wherein the UE capability indication is received during a connection establishment procedure with the base station.

9. The method of claim 1, wherein the frequency resources are provided to the UE via downlink control information (DCI), radio resource control (RRC), or medium access control (MAC) control element (CE) (MAC-CE).

10. The method of claim 1, further comprising:
    transmitting, to the UE, a power compensation report comprising an energy per resource element (EPRE) ratio between physical downlink shared channel (PDSCH) and demodulation reference signal (DMRS).

11. The method of claim 10, wherein the power compensation report is within downlink control information (DCI).

12. The method of claim 10, wherein the power compensation report provides an explicit or implicit EPRE ratio.

13. The method of claim 10, wherein the power compensation report instructs the UE to compensate for zero power rate matched resources or to use an implicit scaling factor to determine the EPRE ratio.

14. A method of wireless communication of a base station, comprising:
    determining one or more narrowband isolated frequencies from a set of frequencies, wherein the one or more narrowband isolated frequencies have a degraded quality;
    allocating frequency resources based on a determination of the one or more narrowband isolated frequencies from the set of frequencies;
    providing, to a user equipment (UE), the frequency resources for communication with the base station; and
    transmitting, to the UE, a power compensation report comprising an energy per resource element (EPRE) ratio between physical downlink shared channel (PDSCH) and demodulation reference signal (DMRS), wherein power for PDSCH and power for DMRS are increased when the one or more narrowband isolated frequencies are not included in allocated frequency resources.

15. An apparatus for wireless communication at a base station, comprising:
    a memory; and
    at least one processor coupled to the memory and configured to:
       determine one or more narrowband isolated frequencies from a set of frequencies, wherein the one or more narrowband isolated frequencies have a degraded quality;
       allocate frequency resources based on a determination of the one or more narrowband isolated frequencies from the set of frequencies, wherein allocation of the frequency resources comprises at least one of skipping unpatterned frequency resources or skipping patterned frequency resources, wherein at least one of the unpatterned frequency resources or the patterned frequency resources comprise the one or more narrowband isolated frequencies, wherein an overall modulation and coding scheme (MCS) is increased based at least on the skipping of the unpatterned frequency resources or the skipping of the patterned frequency resources; and
       provide, to a user equipment (UE), the frequency resources for communication with the base station.

16. The apparatus of claim 15, wherein the at least one processor is further configured to:
    receive, from the UE, a compromised frequency report of spurious frequencies, wherein the compromised frequency report is utilized to determine the one or more narrowband isolated frequencies.

17. A method of wireless communication of a user equipment (UE), comprising:
    receiving, from a base station, an allocation of frequency resources based on a determination of one or more narrowband isolated frequencies from a set of frequencies, wherein the one or more narrowband isolated frequencies have a degraded quality, wherein the allocation of frequency resources comprises at least one of skipped unpatterned frequency resources or skipped patterned frequency resources, wherein at least one of the unpatterned frequency resources or the patterned frequency resources comprise the one or more narrowband isolated frequencies, wherein an overall modulation and coding scheme (MCS) is increased based at least on the skipping of the unpatterned frequency resources or the skipping of the patterned frequency resources; and communicating with the base station based on the allocation of frequency resources.

18. The method of claim 17, wherein the allocation of the frequency resources comprises the skipped unpatterned frequency resources, wherein the skipped unpatterned frequency resources comprise the one or more narrowband isolated frequencies, wherein the overall MCS is increased based at least on the skipped unpatterned frequency resources.

19. The method of claim 17, wherein the allocation of the frequency resources comprises the skipped patterned frequency resources, wherein the skipped patterned frequency resources comprise the one or more narrowband isolated frequencies, wherein the overall MCS is increased based at least on the skipped patterned frequency resources.

20. The method of claim 17, wherein each of the one or more narrowband isolated frequencies is smaller than one resource block (RB).

21. The method of claim 17, further comprising:
transmitting, to the base station, a compromised frequency report of spurious frequencies, wherein the compromised frequency report is utilized by the base station to determine the one or more narrowband isolated frequencies.

22. The method of claim 21, wherein the compromised frequency report is updated, by the UE, such that the base station utilizes an updated compromised frequency report to determine the one or more narrowband isolated frequencies.

23. The method of claim 21, wherein the base station skips the one or more narrowband isolated frequencies based on the compromised frequency report to allocate the frequency resources.

24. The method of claim 21, wherein the compromised frequency report is transmitted, by the UE, within a UE capability indication, wherein the UE capability indication is transmitted during a connection establishment procedure with the base station.

25. The method of claim 17, wherein the frequency resources are received by the UE via downlink control information (DCI), radio resource control (RRC), or medium access control (MAC) control element (CE) (MAC-CE).

26. The method of claim 17, further comprising:
receiving, from the base station, a power compensation report comprising an energy per resource element (EPRE) ratio between physical downlink shared channel (PDSCH) and demodulation reference signal (DMRS).

27. The method of claim 26, wherein the power compensation report is within downlink control information (DCI).

28. The method of claim 26, wherein the power compensation report provides an explicit or implicit EPRE ratio.

29. The method of claim 26, wherein the UE compensates for zero power rate matched resources or uses an implicit scaling factor to determine the EPRE ratio based on the power compensation report.

30. An apparatus for wireless communication at a user equipment (UE), comprising:
a memory; and
at least one processor coupled to the memory and configured to:
receive, from a base station, an allocation of frequency resources based on a determination of one or more narrowband isolated frequencies from a set of frequencies, wherein the one or more narrowband isolated frequencies have a degraded quality, wherein the allocation of frequency resources comprises at least one of skipped unpatterned frequency resources or skipped patterned frequency resources, wherein at least one of the unpatterned frequency resources or the patterned frequency resources comprise the one or more narrowband isolated frequencies, wherein an overall modulation and coding scheme FMCS) is increased based at least on the skipping of the unpatterned frequency resources or the skipping of the patterned frequency resources; and
communicate with the base station based on the allocation of frequency resources.

\* \* \* \* \*